(12) United States Patent
Li et al.

(10) Patent No.: US 10,956,549 B2
(45) Date of Patent: Mar. 23, 2021

(54) DEVICE AND METHOD FOR BIOMETRIC RECOGNITION, AND BIOMETRIC TEMPLATE REGISTRATION METHOD

(71) Applicants: Chipone Technology (Beijing) Co., Ltd, Beijing (CN); Chipone System Technology (Beijing) Co., Ltd, Beijing (CN)

(72) Inventors: Kun Li, Beijing (CN); Dong Xu, Beijing (CN); Lei Fan, Beijing (CN); Jinfang Zhang, Beijing (CN)

(73) Assignees: CHIPONE TECHNOLOGY (BEIJING) CO., LTD, Beijing (CN); CHIPONE SYSTEM TECHNOLOGY (BEIJING) CO., LTD, Beijing (CN)

( * ) Notice: Subject to any disclaimer, the term of this patent is extended or adjusted under 35 U.S.C. 154(b) by 218 days.

(21) Appl. No.: 16/309,341

(22) PCT Filed: Jun. 9, 2017

(86) PCT No.: PCT/CN2017/087776
§ 371 (c)(1),
(2) Date: Dec. 12, 2018

(87) PCT Pub. No.: WO2017/215532
PCT Pub. Date: Dec. 21, 2017

(65) Prior Publication Data
US 2019/0130090 A1  May 2, 2019

(30) Foreign Application Priority Data

Jun. 12, 2016 (CN) .......................... 201610413002.2

(51) Int. Cl.
*G06F 21/32* (2013.01)
*H04L 9/32* (2006.01)
(Continued)

(52) U.S. Cl.
CPC ............ *G06F 21/32* (2013.01); *H04L 9/0877* (2013.01); *H04L 9/3231* (2013.01);
(Continued)

(58) Field of Classification Search
CPC ..... G07C 9/00563; G06F 21/32; G06F 21/60; G06F 21/62; H04L 9/0877; H04L 9/3231;
(Continued)

(56) References Cited

U.S. PATENT DOCUMENTS

| | | | | | |
|---|---|---|---|---|---|
| 6,219,439 | B1* | 4/2001 | Burger | ...................... | G06F 21/34 |
| | | | | | 382/115 |
| 6,636,973 | B1* | 10/2003 | Novoa | ...................... | G06F 21/32 |
| | | | | | 340/5.74 |

(Continued)

FOREIGN PATENT DOCUMENTS

| | | |
|---|---|---|
| CN | 1885315 A | 12/2006 |
| CN | 1900939 A | 1/2007 |

(Continued)

OTHER PUBLICATIONS

International Search Report and Written Opinion for International Application No. PCT/CN2017/087776, dated Aug. 30, 2017, 6 pages.

*Primary Examiner* — Malcolm Cribbs
(74) *Attorney, Agent, or Firm* — Westman, Champlin & Koehler, P.A.

(57) ABSTRACT

A device for biometric recognition, a method for biometric recognition, and a biometric template registration method are disclosed. The device comprises: a sensor for sensing information of a biometric feature; and a security chip for storing a template of the biometric feature, obtaining the information, performing image preprocessing and feature extraction on the obtained information, and comparing features with the stored template to determine a biometric (Continued)

recognition result. Since the whole biometric recognition process is executed in an independent security chip, the security is greatly improved compared with traditional logic isolation solutions.

12 Claims, 6 Drawing Sheets

(51) Int. Cl.
    *H04L 9/08*     (2006.01)
    *H04L 29/06*     (2006.01)
    *G06F 21/60*     (2013.01)

(52) U.S. Cl.
    CPC .......... *H04L 9/3234* (2013.01); *H04L 9/3247* (2013.01); *H04L 63/0861* (2013.01); *G06F 21/60* (2013.01)

(58) Field of Classification Search
    CPC .. H04L 9/3234; H04L 9/3247; H04L 63/0861
    See application file for complete search history.

(56) References Cited

U.S. PATENT DOCUMENTS

| | | | |
|---|---|---|---|
| 9,275,212 B2 | 3/2016 | Li et al. | |
| 9,935,947 B1* | 4/2018 | Machani | H04L 67/1002 |
| 2002/0145507 A1* | 10/2002 | Foster | G07C 9/00563 340/5.53 |
| 2002/0167394 A1* | 11/2002 | Couillard | G06K 19/077 340/5.53 |
| 2002/0186838 A1* | 12/2002 | Brandys | H04L 9/3231 380/30 |
| 2006/0179481 A1* | 8/2006 | D'Agnolo | B42D 25/00 726/20 |
| 2007/0226514 A1* | 9/2007 | Maletsky | G06F 21/86 713/186 |
| 2007/0226515 A1* | 9/2007 | Maletsky | G06F 21/32 713/186 |
| 2007/0237366 A1* | 10/2007 | Maletsky | G07C 9/37 382/115 |
| 2013/0001304 A1* | 1/2013 | Xu | G06Q 20/38215 235/380 |
| 2014/0075502 A1* | 3/2014 | Aissi | G06F 21/60 726/1 |
| 2014/0181959 A1* | 6/2014 | Li | G06F 21/32 726/19 |
| 2014/0365782 A1* | 12/2014 | Beatson | G06F 21/32 713/186 |
| 2015/0161461 A1* | 6/2015 | McNulty | G06K 9/00114 382/116 |
| 2017/0213097 A1* | 7/2017 | Vogel | G06K 9/209 |

FOREIGN PATENT DOCUMENTS

| | | |
|---|---|---|
| CN | 105975839 A | 9/2016 |
| CN | 206162537 U | 5/2017 |

* cited by examiner

DEVICE AND METHOD FOR BIOMETRIC RECOGNITION, AND BIOMETRIC TEMPLATE REGISTRATION METHOD

CROSS-REFERENCE TO RELATED APPLICATION

This application is a Section 371 National Stage application of International Application No. PCT/CN2017/087776, filed 9 Jun. 2017, which published as WO 2017/215532 A1, on 21 Dec. 2017, and claims priority to Chinese Patent Application No. 201610413002.2, filed on Jun. 12, 2016, entitled as 'device and method for biometric recognition, and biometric template registration method', the contents of which are incorporated herein by reference in their entireties.

BACKGROUND OF THE DISCLOSURE

Field of the Disclosure

The disclosure relates to the technical field of biometric recognition, and more particularly, to a device for biometric recognition, a method for biometric recognition, and a biometric template registration method.

Description of the Related Art

Biometric features, such as fingerprints, irises, and faces, are increasingly used in the field of identity authentication due to their uniqueness, privacy, and unchangeability. In traditional biometric recognition schemes, stored templates of biometric features each contain a large amount of original biometric information, and even some templates are biometric images. Once a template is lost or stolen, an intruder can directly use the information included in the template to pass verification, and further implement cross-verification among databases of different applications, for example, fingerprint template information stolen from a fingerprint access control system can be used to invade a corresponding fingerprint-authenticated personal bank account. A corresponding biometric sample can even be forged directly from a specific template of a biometric feature, for example, a corresponding fingerprint may be forged from a fingerprint minutiae template. Meanwhile, due to the unchangeability of biometric features, once the original information is revealed, the resulting damage will be permanent and extensive. Therefore, the protection for the biometric templates in a biometric recognition system is very important.

Currently, Trust Zone security technique (or Secure Enclave security technique) is commonly used in computing devices such as smart phones and tablet computers adopting IOS or Android systems, which logically divide system environment into security zones and non-security zones, and the registration and recognition of the biometric feature are performed in the security zone. However, the division of security zones and non-security zones is purely logical, the information relative to the biometric feature is still easy to be stolen during the processes of transmission, storage and calculation, and as a result, the overall security level of biometric recognition is still not strong enough.

SUMMARY OF THE DISCLOSURE

There is provided a device for biometric recognition, a method for biometric recognition and a biometric feature template registration method, for improving the security level of biometric recognition.

According to one aspect of the disclosure, there is provided a device for biometric recognition, comprising: a sensor configured to sense information of a biometric feature; and a security chip configured to store a template of the biometric feature, obtain the information of the biometric feature from the sensor, perform image preprocessing and feature extraction on the obtained information of the biometric feature, and compare features with the stored template to determine a biometric recognition result.

In some embodiments, the sensor and the security chip are packaged together.

In some embodiments, the security chip comprises: a memory configured to store the template of the biometric feature; and a processor configured to obtain the information of the biometric feature from the sensor, perform image preprocessing and feature extraction on the obtained information of the biometric feature, and compare features with the stored template of the biometric feature to determine the biometric recognition result, wherein the template of the biometric feature is generated in a registration phase by the processor by obtaining the information from the sensor and performing image preprocessing and feature extraction on the information of the biometric feature.

In some embodiments, the processor comprises: an image obtaining module configured to obtain the information of the biometric feature from the sensor; an image preprocessing module configured to preprocess the information of biometric feature obtained by the image obtaining module to obtain a grayscale image of the biometric feature; a feature extraction module configured to extract biometric points of the biometric feature from the grayscale image obtained by the image preprocessing module to obtain biometric data relative to the biometric points; and a feature comparison module for comparing the biometric data obtained by the feature extraction module with the template of the biometric feature stored in the memory, and determining that biometric recognition result is passing if the biometric data matches the template of the biometric feature, and otherwise, determining that the biometric recognition result is failing.

In some embodiments, the processor further comprises a signature module for providing digital signature for the biometric recognition result.

In some embodiments, providing the digital signature comprises: generating a key pair including a public key and a private key after the template of the biometric feature is registered successfully, storing the private key in the security chip, sending the public key to external of the device for biometric recognition, and digitally signing the biometric recognition result by using the private key after the biometric recognition result is determined.

In some embodiments, the security chip is a secure element SE.

In some embodiments, the device for biometric recognition is installed in a computing device, and the security chip is physically isolated from a system environment of the computing device.

In some embodiments, the biometric feature comprises a fingerprint, the information of the biometric feature comprises image information of the fingerprint, and the biometric data comprises biometric point data of the fingerprint, and the template of the biometric feature comprises a template of the fingerprint.

According to another aspect of the disclosure, there is provided a method for biometric recognition, comprising: sensing information of a biometric feature by using a sensor in accordance with a biometric recognition instruction; obtaining the information of the biometric feature from the sensor by using a security chip, performing image preprocessing and feature extraction on the obtained information to obtain biometric data, and comparing the biometric data with a template of the biometric feature stored in the security chip to determine a biometric recognition result.

In some embodiments, the method for biometric recognition further comprises: providing digital signature for the biometric recognition result via the security chip.

According to another aspect of the disclosure, there is provided a biometric template registration method, comprising: sensing information of a biometric feature by using a sensor in accordance with a biometric registration instruction; obtaining the information of the biometric feature from the sensor via a security chip, performing image preprocessing and feature extraction on the obtained information of the biometric feature to obtain biometric data, and storing the biometric data as a template of the biometric feature in the security chip.

BRIEF DESCRIPTION OF THE DRAWINGS

In order to explain the technical solutions according to the embodiments of the present disclosure more clearly, drawings of the embodiments will be briefly described in the following description. Obviously, the drawings in the following description only relate to some embodiments of the present disclosure, and are not intended to limit the disclosure.

DETAILED DESCRIPTION OF THE DISCLOSURE

To make the objectives, technical solutions, and advantages of the embodiments of the present disclosure clearer, the technical solutions of the embodiments of the present disclosure will be described clearly in connection with the drawings of the embodiments of the present disclosure. Obviously, the following embodiments are only some embodiments of the present disclosure and not all embodiments. All other embodiments obtained by an ordinary skilled in the art based on the described embodiments of the present disclosure without creative efforts shall fall within the protection scope of the present disclosure.

Figure 1:
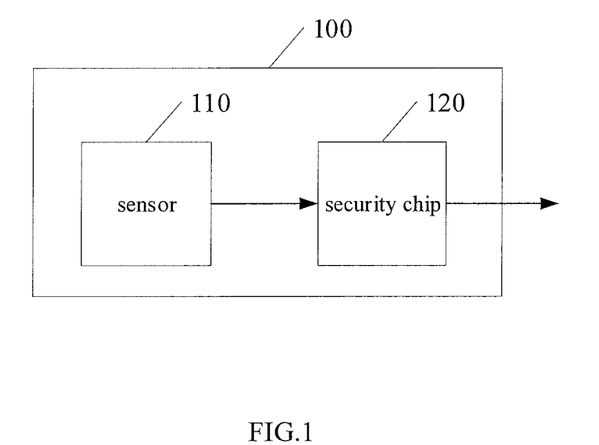
FIG. 1 shows a block diagram of a device for biometric recognition according to an embodiment of the present disclosure.

FIG. 1 shows a block diagram of a device 100 for biometric recognition according to an embodiment of the present disclosure. The embodiment of the disclosure is applicable to the identification on one or more biometric features, examples of which include but are not limited to textures (including fingerprints, palm prints, veins and related accessory features such as sweat holes), biofilms (e.g., iris, retina, etc.), faces, ear canals, voices, body shapes, personal habits (such as the strength and frequency of keystrokes, signatures, gaits), etc. In the embodiment, the biometric features can be for example, fingerprints.

In some embodiments, the device 100 for biometric recognition can be installed in a computing device such as a smart phone, a tablet computer and the like, and the security chip 120 is physically isolated from the system environment of the computing device.

As shown in FIG. 1, the device 100 for biometric recognition includes a sensor 110 and a security chip 130.

The sensor 110 is used to sense information of a biometric feature. The information of the biometric feature can include information relative to one or more biometric features such as textures (including fingerprints, palm prints, veins and related accessory features such as sweat holes), biofilms (e.g., iris, retina, etc.), faces, ear canals, voices, body shapes, personal habits (such as the strength and frequency of keystroles, signatures, gaits), etc. For fingerprint recognition, for example, the information can include image information of fingerprints. In an embodiment of the disclosure, the sensor 210 can be an optical sensor, a semiconductor sensor, an ultrasonic sensor, a radio frequency identification sensor or any sensor that can sense the information of the biometric feature.

The security chip 120 is used for storing a template of the biometric feature, obtaining the information of the biometric feature from the sensor 110, performing image preprocessing and feature extraction on the obtained information of the biometric feature, and comparing the features with the stored template of the biometric feature to determine a biometric recognition result. In some embodiments, the security chip 130 can be a secure element SE.

In some embodiments, the sensor 110 and the security chip 130 can be packaged together. For example, the sensor 110 and the security chip 120 can be packaged together by using a polycrystalline package process. Examples of the polycrystalline package process include but are not limited to a System in Package (SiP) process and a Multi-Chip Module (MCM) process.

Figure 2:
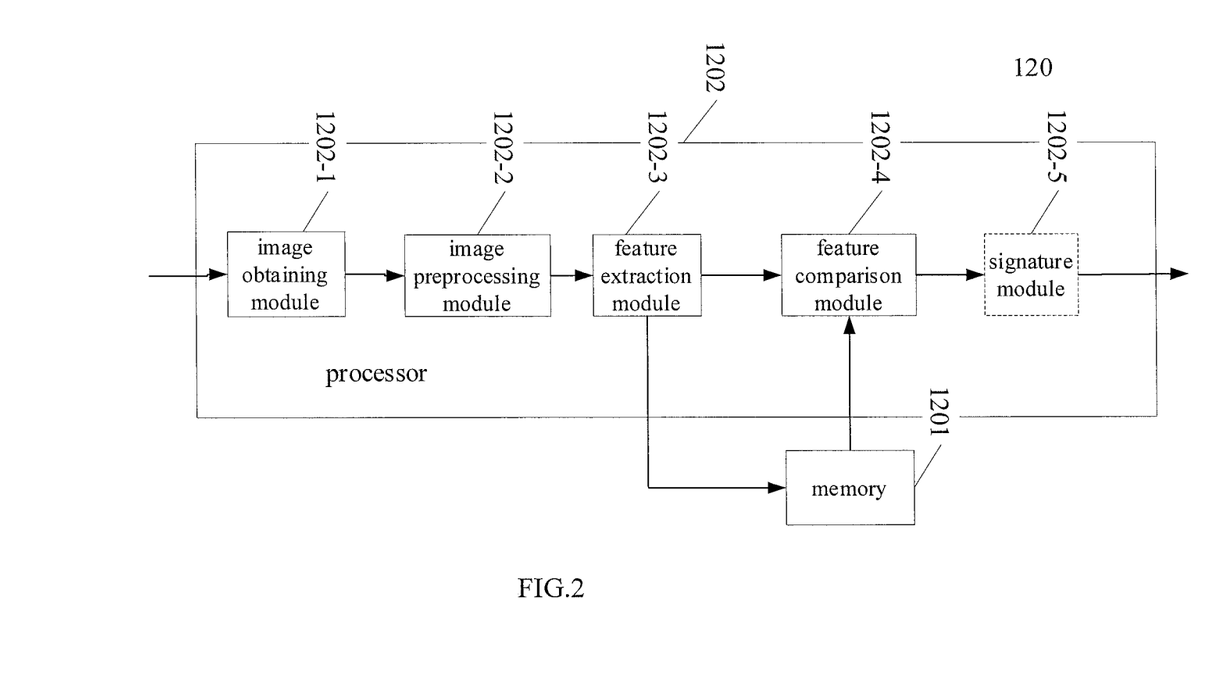
FIG. 2 shows a block diagram of a security chip in a device for biometric recognition according to an embodiment of the present disclosure.

FIG. 2 shows a block diagram of a security chip in the device for biometric recognition according to the embodiment of the present disclosure. As shown in FIG. 2, the security chip 120 can include a memory 1201 and a processor 1202.

The memory 1201 is used for storing the template of the biometric feature. The template of the biometric feature can be generated in a registration phase by the processor 1202 by obtaining the information of the biometric feature from the sensor 110 and performing image preprocessing and feature extraction on the obtained information of the biometric feature. In the embodiment, a memory module 2301 may be a non-volatile memory, such as a flash memory, an electrically erasable programmable read only memory (EEPROM), erasable programmable read only memory (EPROM), programmable read only memory (PROM), or other magnetic or electrical storage media where data can continue to be retained in the condition of power failure.

The processor 1202 is used to obtain the information of the biometric feature from the sensor 110, perform image preprocessing and feature extraction on the obtained information of the biometric feature, and compare features with the stored template of the biometric feature to determine the biometric recognition result.

As shown in FIG. 2, the processor 1202 may include an image obtaining module 1202-1, an image preprocessing module 1202-2, a feature extraction module 1202-3, and a feature comparison module 1202-4. Alternatively, the processor 1202 may also include a signature module 1202-5.

The image obtaining module 1202-1 is used to obtain the information of the biometric feature from the sensor 110. For example, for fingerprints, the image obtaining module 2201 may obtain the image information of the fingerprints from the sensor 210 one or more times by a sliding acquisition mode or a pressure acquisition mode.

The image preprocessing module 1202-2 is used to preprocess the information of the biometric feature obtained by the image obtaining module 1202-1 to obtain a grayscale image of the biometric feature. For example, for a fingerprint image, the preprocessing may include, for example, image normalization, fingerprint effective area segmentation processing, fingerprint direction map processing, fingerprint enhancement processing, fingerprint binarization processing, and fingerprint refinement processing and the like.

The feature extraction module 1202-3 is used to extract biometric points of the biometric feature from the grayscale image obtained by the image preprocessing module 1202-2 to obtain the biometric data related to the biometric points of the biometric feature. For example, the biometric data may include the biometric point data of a fingerprint. In the phase of registering the template of the biometric feature, the generated biometric data is stored in the memory 1201 as a template of the biometric feature.

The feature comparison module 1202-4 is used to compare the biometric data obtained by the feature extraction module 1202-3 with the template of the biometric feature stored in the memory 1201, and determine the biometric recognition result, wherein if the biometric data matches the template, the biometric recognition result is passing, and otherwise, the biometric recognition result is failing.

The signature module 1202-5 is used to provide digital signature for the biometric recognition result. In some embodiments, providing the digital signature may include: generating a key pair including a public key and a private key after the template of the biometric feature is registered successfully, storing the private key in the security chip 120, and sending the public key to the external of the device 100 for biometric recognition and providing digital signature for the biometric recognition result by using the private key after the biometric recognition result is determined.

Figure 5A:
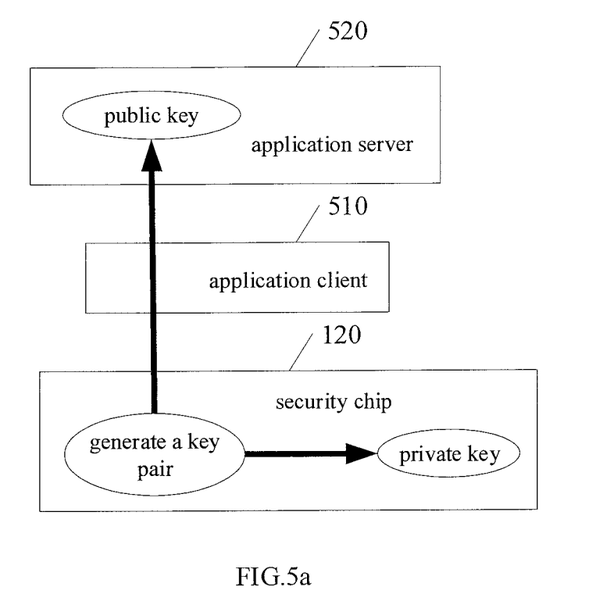
FIG. 5 shows a schematic diagram of an example digital signature process.
Figure 5B:
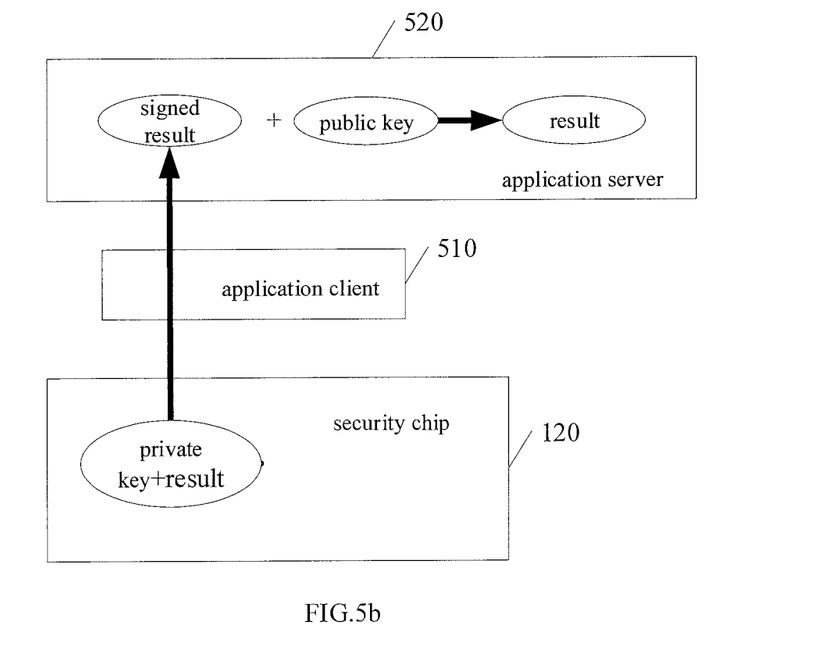

FIG. 5 shows a schematic diagram of an example digital signature process. As an example, the signature process includes a signature generation phase (as shown in FIG. 5a) and a signature comparison phase (as shown in FIG. 5b).

As shown in FIG. 5a, after the template of the biometric feature is successfully registered, the signature generation phase begins. At this phase, the security chip 120 may generate a key pair including a public key and a private key, store the private key in the security chip 120 (for example, store it in the memory 1201), and send the public key to the external of the device for biometric recognition, for example, the public key is sent to an application server 520 via an application client 510 where the security chip 120 is located. The application client 510 where the security chip 120 is located may be a computing device such as a smart phone or a tablet computer, where the device 100 for biometric recognition according to the embodiment of the present disclosure is installed.

As shown in FIG. 5b, after the biometric recognition result is determined, the signature comparison phase begins. At this phase, the security chip 120 can use the private key to digitally sign the biometric recognition result and send the signed biometric recognition result to the application server 520 via the application client 510, and the application server 520 can use the corresponding public key received previously to verify whether the signed biometric recognition result is valid.

Figure 6:
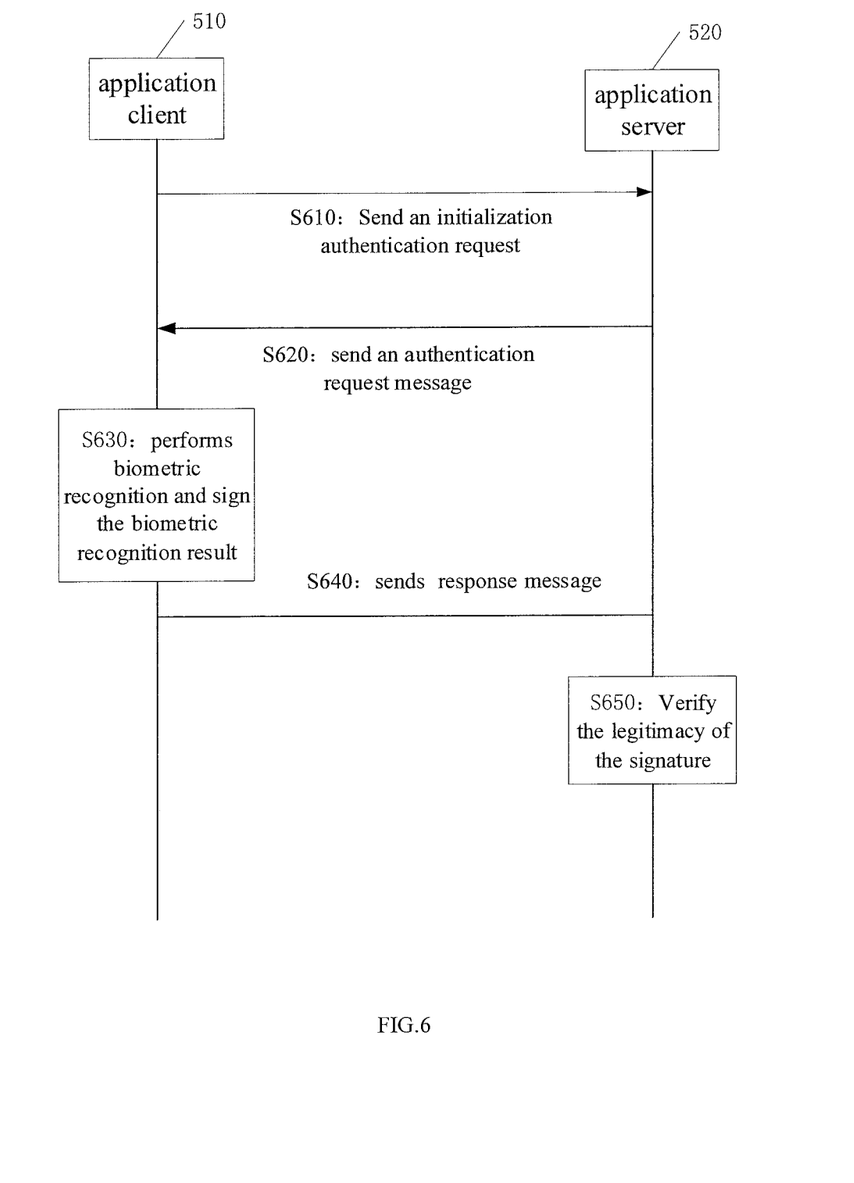
FIG. 6 shows a schematic diagram of an example signature authentication process between an application client and an application server.

FIG. 6 shows an example diagram of a signature authentication process between an application client 510 and an application server 520.

In step S610, the application client 510 sends an initialization authentication request to the application server 520.

In step S620, the application server 520 sends an authentication request message to the application client 510.

In step S630, the application client 510 performs biometric recognition by using, for example, a security chip installed therein and uses the private key to sign the biometric recognition result.

In step S640, the application client 510 sends a response message including the signed biometric recognition result to the application server 520.

In step S650, the application server 520 verifies the legitimacy of the signature using the corresponding public key.

In some embodiments, the system environment of the computing device is divided into security zones and non-security zones (for example, a smart phone or a tablet computer using Trust Zone security technique or Secure Enclave security technique), the biometric recognition result provided by the device 100 for biometric recognition may be either transmitted in the non-security zones of the computing device for simplifying the operation, or transmitted in the security zones for further improving security. Certainly, the device for biometric recognition according to the embodiment of the present disclosure can also be installed in a computing device that is not divided into security zones and non-security zones. It can be seen that the embodiments of the present disclosure are applicable to various existing computing devices such as smart phones, tablet computers, and thus have a high compatibility.

Figure 3:
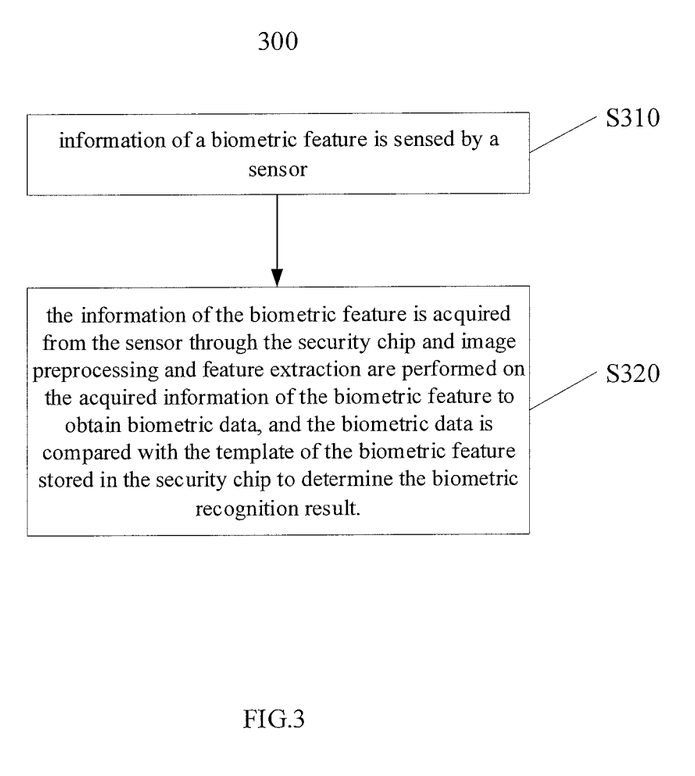
FIG. 3 shows a diagram of a method for biometric recognition according to an embodiment of the present disclosure.

FIG. 3 shows a diagram of a method 300 for biometric recognition according to an embodiment of the present disclosure.

In step S310, information of a biometric feature, such as fingerprint image information, is sensed by a sensor according to a biometric recognition instruction. The biometric recognition instruction can be provided by a computing device such as a smart phone, a tablet computer and the like.

In step S320, the information of the biometric feature is acquired from the sensor through the security chip such as a secure element SE, image preprocessing and feature extraction are performed on the acquired information of the biometric feature to obtain biometric data, and the biometric data is compared with the template of the biometric feature stored in the security chip to determine the biometric recognition result. For example, the security chip may acquire the information of the biometric feature (e.g., image information of a fingerprint) from a sensor, the acquired information of the biometric feature is preprocessed to obtain a grayscale image of the biometric feature, biometric points are extracted from the obtained grayscale image to acquire the biometric data relative to the biometric points (e.g., biometric point data of a fingerprint), the biometric data obtained by a microprocessor is compared with the template of the biometric feature stored in the security chip (e.g., a template of a fingerprint) to determine the biometric recognition result. For example, if the biometric data matches the template of the biometric feature, it is determined that the biometric recognition result is passing, and otherwise, the biometric recognition result is failing.

In some embodiments, a template of the biometric feature such as a template of a fingerprint, may be generated at a registration phase by a microprocessor by obtaining the information of the biometric feature sensed by the sensor, performing image preprocessing, and feature extraction on the obtained information of the biometric feature, and the template of the biometric feature is stored in the memory of the security chip, such as a non-volatile memory. Examples of the non-volatile memory include, but are not limited to, a flash memory, an electrically erasable programmable read only memory (EEPROM), an erasable programmable read only memory (EPROM), a programmable read only memory (PROM), or other magnetic or electrical storage media where data can continue to be retained in the condition of power failure.

In some embodiments, the method 300 may further include: providing digital signature on the biometric recognition result by using the security chip. FIG. 5 and FIG. 6 show the examples of processes for providing the digital signature.

In some embodiments, the method 300 may further include transmitting the biometric recognition result to a computing device. As an example, for a computing device such as a smart phone, tablet computer or the like using Trust Zone security technique or Secure Enclave security technique, the unsigned or signed biometric recognition result can be sent to the computing device through the security zones or non-security zones of the computing device.

Figure 4:
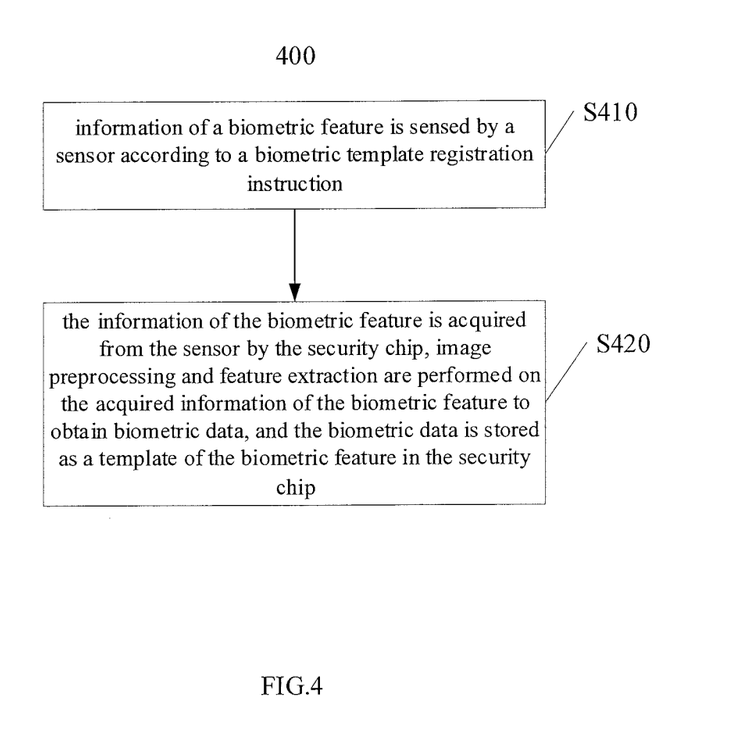
FIG. 4 shows a diagram of a biometric template registration method according to an embodiment of the present disclosure.

FIG. 4 shows a diagram of a biometric template registration method 400 according to an embodiment of the present disclosure.

In step S410, information of a biometric feature, such as image information of a fingerprint, is sensed by a sensor according to a biometric template registration instruction. The biometric template registration instruction can be provided by a computing device such as a smart phone, a tablet computer, or the like.

In step S420, the information of the biometric feature is acquired from the sensor by the security chip, image preprocessing and feature extraction are performed on the acquired information of the biometric feature to obtain biometric data, and the biometric data is stored as a template of the biometric feature in the security chip. In some embodiments, the security chip is physically isolated from the system environment of the computing device. As an example, the security chip may acquire the information of the biometric feature (e.g., image information of a fingerprint) from the sensor, preprocess the acquired information of the biometric feature to obtain a grayscale image of the biometric feature, and biometric points are extracted from the obtained grayscale image to obtain biometric data relative to the biometric points of the biometric feature (for example, biometric point data of a fingerprint), and the biometric data is stored as a template of the biometric feature in the security chip. For example, biometric data may be stored as a template of the biometric feature in a memory of the security chip, such as a non-volatile memory. Examples of non-volatile memory include, but are not limited to, a flash memory, an electrically erasable programmable read only memory (EEPROM), an erasable programmable read only memory (EPROM), a programmable read only memory (PROM), or other magnetic or electrical storage media where data can continue to be retained in the condition of power failure.

Embodiments of the present disclosure also provide a computer-readable storage medium storing instructions for performing the above method.

In the embodiments of the present disclosure, the entire biometric recognition process is performed in an independent security chip. Because the security chip is physically isolated from the system environment of the computing device such as a smartphone or a tablet computer, transmission, storage, and calculation in an open system environment are avoided, thus the security is greatly improved comparing to traditional logical isolation solutions.

In an embodiment of the present disclosure, the security chip and the sensor are packaged together, so that on one hand, physical isolation from the system environment of the computing device may be further enhanced, and on the other hand, the security of information transmission between the security chip and the sensor is improved.

Embodiments of the present disclosure can directly provide the biometric recognition result in a clear text (for example, in a high-level security system environment), and can also provide a digitally signed biometric recognition result in open application environment to prevent the biometric recognition result output by the security chip from being tampered by Trojans or other viruses, so that, behaviors which are not identified by fingerprint recognition will not be authorized. It can be seen that the embodiments of the present disclosure have a flexible implementation manner and the system environment can be configured to have different security levels in accordance with requirements.

The above description is merely exemplary embodiments of the present disclosure and is not intended to limit the scope of the present disclosure. The protection scope of the present disclosure is determined by the appended claims.

The invention claimed is:

1. A device for biometric recognition, comprising:
   a sensor configured to sense information of a biometric feature; and
   a security chip configured to store a template of the biometric feature, obtain the information of the biometric feature, perform image preprocessing and feature extraction on the obtained information of the biometric feature, and compare features with the stored template of the biometric feature to determine a biometric recognition result,
   wherein a key pair including a public and a private key is generated after the template of the biometric feature is successfully registered, storing the private key in the security chip, and sending the public key to an external of the device for biometric recognition,
   wherein after the biometric recognition result is determined, the biometric recognition result is digitally signed by the private key stored in the security chip, and is verified by the public key stored in the external of the security chip.

2. The device according to claim 1, wherein the sensor and the security chip are packaged together.

3. The device according to claim 2, wherein the sensor and the security chip are packaged together by using a polycrystalline package process.

4. The device according to claim 1, wherein the security chip comprises:
   a memory configured to store the template; and
   a processor configured to obtain the information, perform image preprocessing and feature extraction on the obtained information, and compare features with the stored template to determine the biometric recognition result, wherein the template is generated in a registration phase by the processor by obtaining the information from the sensor and performing image preprocessing and feature extraction on the information.

5. The device according to claim 4, wherein the processor comprises:
   an image obtaining module configured to obtain the information from the sensor;
   an image preprocessing module configured to preprocess the information obtained by the image obtaining module to obtain a grayscale image of the biometric feature;
   a feature extraction module configured to extract biometric points of the biometric feature from the grayscale image obtained by the image preprocessing module to obtain biometric data relative to the biometric points; and
   a feature comparison module for comparing the biometric data obtained by the feature extraction module with the template stored in the memory, and determining that biometric recognition result is passing if the biometric data matches the template of the biometric feature, and otherwise, determining that the biometric recognition result is failing.

6. The device according to claim 5, wherein the processor further comprises a signature module for providing digital signature for the biometric recognition result.

7. The device according to claim 1, wherein the security chip is a secure element.

8. The device according to claim 1, wherein the device for biometric recognition is installed in a computing device, and the security chip is physically isolated from a system environment of the computing device, the biometric recognition result is either transmitted in a non-security zone of the computing device or in a security zone of the computing device.

9. The device according to claim 1, wherein the biometric feature is a fingerprint, the information of the biometric feature comprises image information of the fingerprint, and the biometric data comprises biometric point data of the fingerprint, and the template of the biometric feature comprises a template of the fingerprint.

10. A biometric template registration method for the device according to claim 1, comprising:
    sensing information of a biometric feature by using a sensor in accordance with a biometric registration instruction;
    obtaining the information from the sensor via a security chip, performing image preprocessing and feature extraction on the obtained information to obtain biometric data, and storing biometric data as a template of the biometric feature in the security chip.

11. A method for biometric recognition, comprising:
    sensing information of a biometric feature by using a sensor in accordance with a biometric recognition instruction; and
    obtaining the information from the sensor by using a security chip, performing image preprocessing and feature extraction on the obtained information to obtain biometric data, and comparing the biometric data with a template of the biometric feature stored in the security chip to determine a biometric recognition result,
    wherein a key pair including a public and a private key is generated after the template of the biometric feature is successfully registered, storing the private key in the security chip, and sending the public key to an external of the device for biometric recognition,
    wherein after the biometric recognition result is determined, the biometric recognition result is digitally signed by the private key stored in the security chip, and is verified by the public key stored in the external of the security chip.

12. The method according to claim 10, further comprising: providing digital signature for the biometric recognition result via the security chip.

* * * * *